May 11, 1954
B. E. PHELPS
2,678,173
TAPE FEED MECHANISM
Filed Dec. 29, 1950
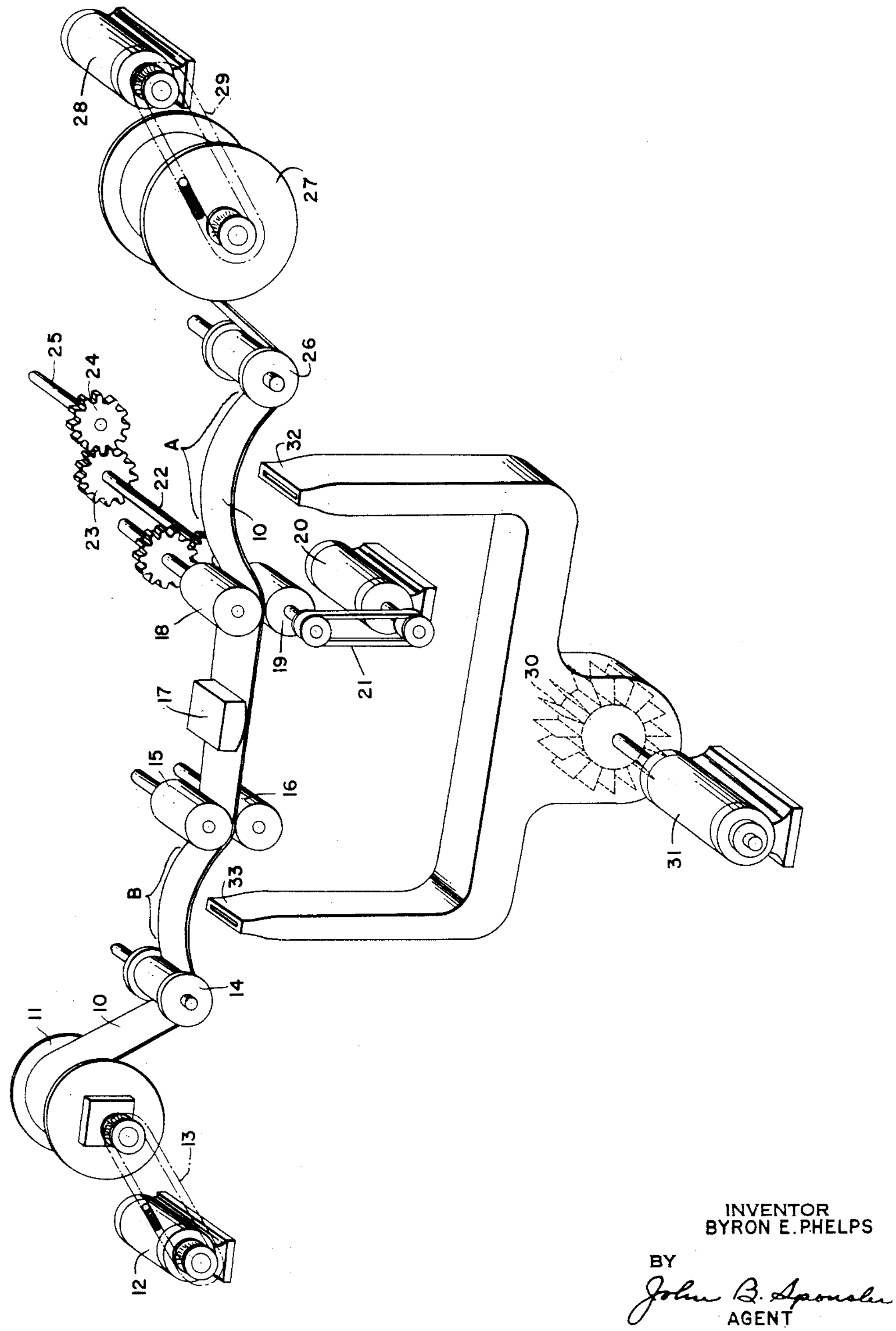
INVENTOR
BYRON E. PHELPS
BY
John B. Sponsler
AGENT Patented May 11, 1954 2,678,173

UNITED STATES PATENT OFFICE 2,678,173

TAPE FEED MECHANISM

Byron E. Phelps, Poughkeepsie, N. Y., assignor to International Business Machines Corporation, New York, N. Y., a corporation of New York Application December 29, 1950, Serial No. 203,349

3 Claims. (Cl. 242—75)

The present invention relates to tape feeding mechanism, and in particular to mechanism for feeding magnetic tape and the like wherein information is contained in the form of index representations so that each magnetized area or spot is necessary to be identified in time, or in some similar relation, with mechanism used for indexing the positions of the said magnetized areas or spots.

Normally in magnetic tape feeding devices, and in other tape feeds of a similar nature, there are provided a supply spool, a sensing station, and a takeup spool, together with the necessary connecting and driving mechanisms. In the present invention conventional means are utilized for feeding a magnetic tape, or the like, from a supply spool past a sensing station to a takeup spool.

It is an object of this invention to provide a means for overcoming the effects of the slack in tape feeding devices wherein there is a disparity between the driving means employed between the takeup and supply spools.

It is a further object of this invention to provide a simple and effective device for regulating and controlling the slack in a tape feeding device wherein a positive drive is used intermittent of the supply and takeup drive mechanisms whereinbetween a disparity in driving speed may occur.

Other objects of the invention will be pointed out in the following description and claims and illustrated in the accompanying drawing, which discloses, by way of example, the principle of the invention and the best mode, which has been contemplated, of applying that principle.

In the drawing:

A tape 10 into which magnetic registrations have been made is fed from a supply spool 11 which is driven at a predetermined speed by a motor 12 through a belt 13. The tape is fed under an idler roller 14 between the idler rollers 15 and 16, and passes under a magnetic sensing head 17, thereafter being positively driven by the geared rollers 18 and 19 which are in turn driven by a motor 20 through a belt 21. Thereafter the tape 10 passes under an idler roller 26 to a takeup spool 27 which is in turn driven by a motor 28 through a belt 29. The belts 13 and 29 are of a spring type variety to provide an impositive drive between their respective motors and spools. The belt 21, however, is a positive drive so that at any time when the motor 20 is stationary the tape 10 is seized between the rollers 18 and 19 in such a manner that it cannot advance except by slippage. The roller 19 is fixed to a shaft 22 having a gear 23 which drives a gear 24 fixed to a shaft 25 leading to indexing mechanism which is advanced positively with the feeding of the tape by the rollers 18 and 19. The indexing mechanism is no part of the present invention and is therefore not shown.

Arranged below the tape 10 is a blower mechanism comprising an impeller 30 driven by a motor 31 having the tuyères 32 and 33. The tuyère 32 is arranged to force a jet of air against the surface of the tape 10 in the area A, and tuyère 33 is similarly arranged to force a jet of air against the tape 10 in the area B.

In the operation of the device normally tape is unwound from the spool 11 by the operation of the motor 12, and after progressing through various idler rollers is taken up by the spool 27, which is driven by the motor 28. The positive drive provided by the rollers 18 and 19 is simultaneously operated with the supply and takeup drives; however, due to the variations in inertia of the supply spool and the takeup spool as tape is withdrawn and wound, slack sections of the tape may occur, which cause erroneous operation of the tape feeding mechanism, and may under certain circumstances effect wrinkling or breakage of the tape. In order to overcome the possibilities of breakage or other tape deformation due to a slack section of the tape the jets of air admitted by the tuyères 32 and 33 are arranged to take up and maintain any slack in the areas A and B respectively, thereby retaining sufficient tension to prevent the tape from becoming deformed or from leaving the normal path of its travel. As shown in the drawing, this results in loops of the tape in the areas A and B, respectively.

Let it be assumed that the positive drive rollers 18 and 19 are operating and that there is no slack in the area B, the tape being unwound from the spool 11 at the same rate that it is being passed between the positive drive rollers 18 and 19, and that the inertia of the spool 27 is greatly increased so that tape slack would be encountered somewhere in its path of travel between the rollers 18 and 19 and the spool 27, due to its reduced rate of speed of rotation. The jet of air which constantly is admitted from the tuyère 32 will cause a loop in the area A, as indicated in the drawing, thereby maintaining tension sufficient to retain the tape against the roller 26 and to permit the proper reeling upon the spool 27. When all of the tape drives, that is the motor 12, the motor 20 and the motor 28, are simultaneously deenergized the inertia of the spool 27 will cause that spool to rotate after the other drives have become stationary. Consequently, the loop in the tape 10 at the area A, maintained by the jet of air from tuyère 32, will be reduced. Similarly, since the inertia of spool 11 has been reduced when the tape drives are again started (simultaneously), tape may be unwound from spool 11 at a higher rate than the positive feed rollers 18 and 19 so that slack may occur in the area B. In this instance the jet of air emitted by the tuyère 33 will cause a loop to be formed in the area B thereby maintaining tension in the tape 10 to avoid deformation or breakage. In the manner indicated above a constant tension is thereby maintained by the compensating effects of the air jets against the surface of tape 10 at all times and under all conditions of operation where disparities in driving speed occur among various drives in tape feeding mechanisms of the kind illustrated. This advantage is particularly desirable where tapes of a fragile nature are used, such as those commonly employed in magnetic recording devices.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a tape feeding mechanism having a driven supply spool, a driven takeup spool, and a positive tape drive therebetween, means for instantaneously absorbing the tape slack resulting from tape speed disparities between said positive tape drive and said spools and for enabling the tape slack to be reduced instantaneously in response to a reduction in tape speed disparities, said means comprising an impeller for supplying a constant air stream, and guide means cooperating with said impeller for directing the air stream in one or more jets against the tape surface at locations where tape slack occurs for maintaining overall tension in the tape without imparting mechanical inertia thereto.

2. In a tape feed mechanism including a positive tape drive and a driven takeup spool wherein disparities in tape speeds occur intermittently between said drive and said spool resulting in tape slack therebetween, means for instantaneously absorbing the tape slack as it occurs and for enabling the tape slack to be reduced instantaneously in response to a reduction in the tape speed disparity, said means comprising an impeller for supplying a constant air stream, and guide means cooperating with said impeller for directing the air stream in a jet against the tape at a location where tape slack occurs, thereby yieldably maintaining the slack portion of the tape under tension without imparting mechanical inertia thereto.

3. In a tape feed mechanism including a positive tape drive and a driven tape supply spool wherein disparities in tape speeds occur intermittently between said drive and said spool producing tape slack therebetween, means for instantaneously taking up the tape slack resulting from tape speed disparity and for enabling the tape slack to be reduced instantaneously in response to a reduction in such disparity, said means comprising an impeller for supplying a constant air stream, and guide means cooperating with said impeller for directing the air stream in a jet against the tape at a location where tape slack occurs, thereby yieldably maintaining the slack portion of the tape under tension without imparting mechanical inertia thereto.

References Cited in the file of this patent

UNITED STATES PATENTS

| Number | Name | Date |
|---|---|---|
| 1,231,360 | Howell | June 26, 1917 |
| 1,404,284 | Fougner | Jan. 24, 1922 |
| 1,630,713 | Meyer | May 31, 1927 |
| 1,999,552 | Ward | Apr. 30, 1935 |
| 2,037,806 | Little | Apr. 21, 1936 |
| 2,103,766 | Cahill | Dec. 28, 1937 |
| 2,190,941 | Gardner | Feb. 20, 1940 |
| 2,221,384 | Pfarrwaller | Nov. 12, 1940 |
| 2,366,105 | Hayes et al. | Dec. 26, 1944 |
| 2,438,365 | Hepp et al. | Mar. 23, 1948 |
| 2,569,264 | Stone et al. | Sept. 25, 1951 |

FOREIGN PATENTS

| Number | Country | Date |
|---|---|---|
| 624,686 | Germany | Jan. 25, 1936 |